1,754,188

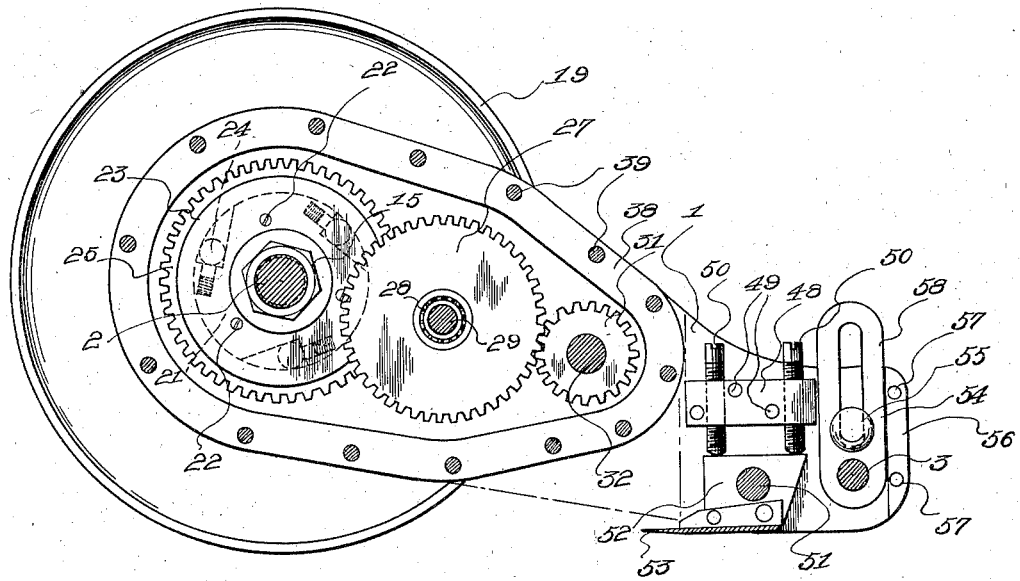
Fig. 2
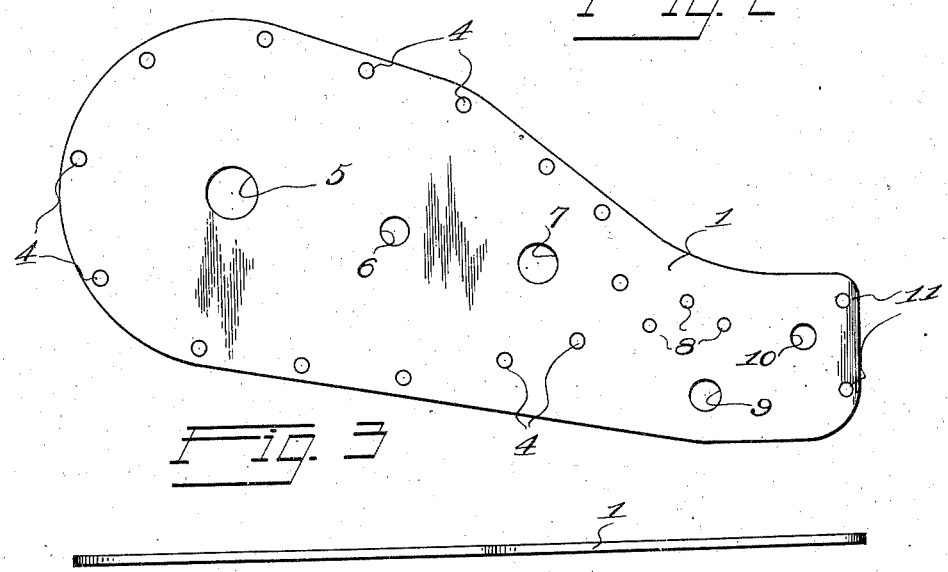
Fig. 3
Fig. 4
Inventor
HARRY T. COLDWELL,
By George A. Prevost
Attorney Patented Apr. 8, 1930

UNITED STATES PATENT OFFICE

HARRY T. COLDWELL, OF NEWARK, NEW JERSEY, ASSIGNOR TO PHILADELPHIA LAWN MOWER COMPANY INC., OF PHILADELPHIA, PENNSYLVANIA, A CORPORATION OF PENNSYLVANIA

LAWN MOWER

Application filed June 10, 1926. Serial No. 114,995.

This invention relates to improvements in lawn mowers.

Heretofore, lawn mowers have generally been provided with side bars, each usually formed of a special stamping or casting, and consequently, it has in most cases been necessary to employ one stamping die or mold for the right hand bar and a different die or mold for the left hand bar. It is the primary object of the present invention to provide a lawn mower in which the side bars are of improved identical construction, so that a bar made in accordance with this invention may be used at either side of the machine.

Another object of the invention is to provide improved driving means for actuating the cutter shaft from the ground wheels.

A still further object is to furnish a lawn mower with a novel back roller and means for adjustably mounting the same.

With the foregoing, and other objects in view which will appear as the description proceeds, the invention consists in the novel features hereinafter described in detail, illustrated in the accompanying drawings, and more particularly pointed out in the appended claims.

Referring to the drawings:

Fig. 2 is a vertical sectional view taken on line 2—2 of Fig. 1.

Fig. 3 is an elevation of one of the side bars or plates; and

Fig. 4 is an edge view of one of said plates.

Figure 1:
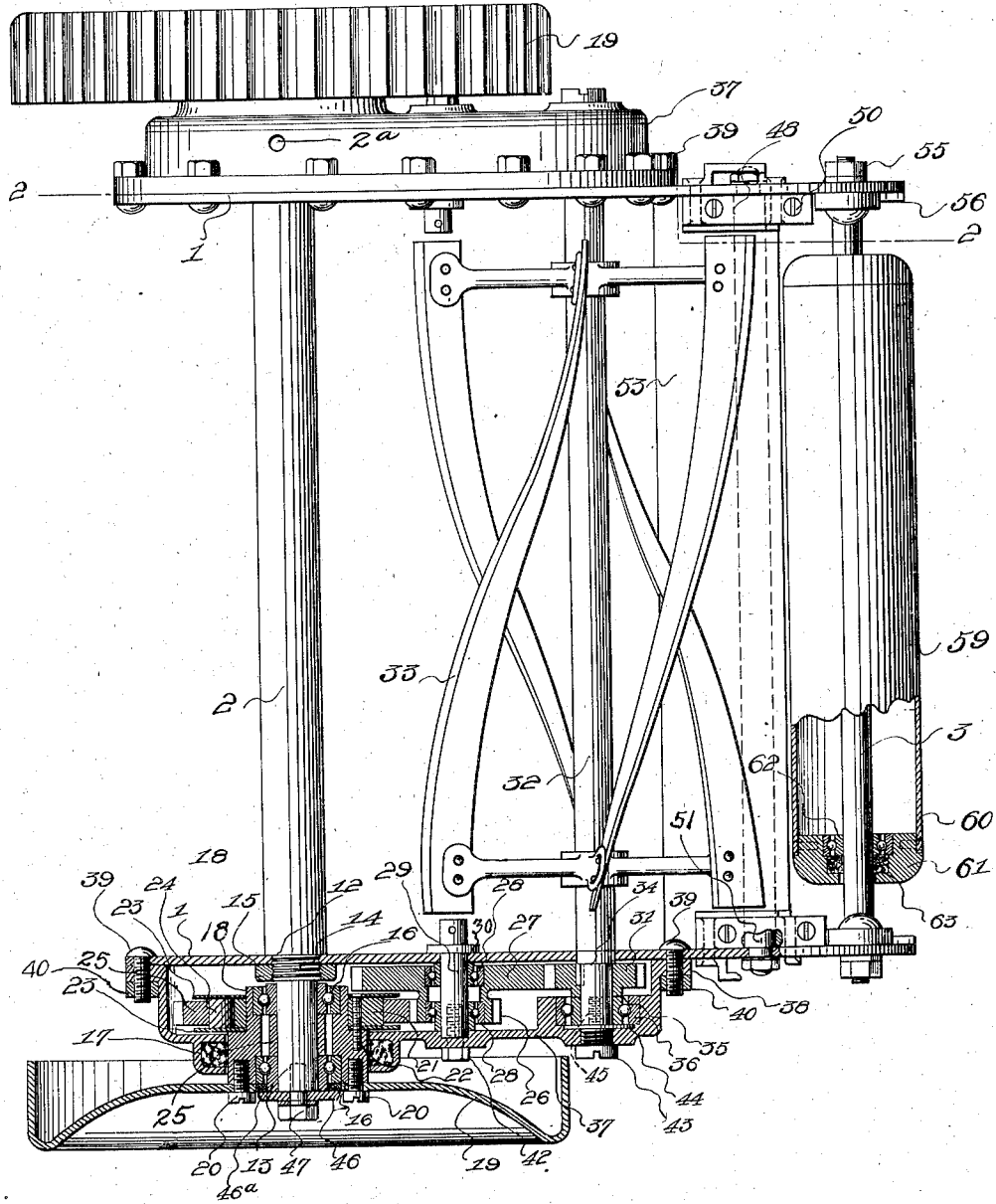
Fig. 1 is a top plan view of my improved lawn mower with certain parts in section.

The frame of the machine consists of side bars or plates 1, stationary cross bars or axles 2 and 51; the axles 2 and 51 being rigidly secured to the side plates. As the side plates 1 in the present invention form an important part of the new mower, I have illustrated the same in detail in Figs. 3 and 4. From these figures, it will be seen that each side plate 1 is identical with the other, and is formed of a sheet metal stamping. Each stamping consists of a flat metal plate, which, during the course of manufacture, is punched at the points 4, 5, 6, 7, 8, 9, 10 and 11 for purposes hereinafter mentioned. As each sheet or plate 1 is the same, it may be used at either the right or left hand side of the machine, and this will effect a saving in machinery in manufacturing the mowers.

The axle 2 has shoulders 12 near its ends which abut against the inner surfaces of the side bars of plates 1 when the ends of said axle are passed through the apertures 5 in these plates. A reduced portion 13 at each end of the axle 2 is joined to the main portion of the axle by a threaded part 14, the latter being adapted to receive a nut 15 which clamps the side bar 1 against the shoulder 12, and thus renders the frame rigid at the front.

Each of the reduced portions 13, of the axle 2 is provided with a plurality of anti-friction ball bearings 16 which are spaced apart by a sleeve 17. A stepped collar 18 has recesses to receive the outer rings of the ball bearings 16, and each of these collars is secured to one of the supporting wheels 19 by means of suitable fastening elements, such as screws 20. From this description it will be readily seen that the collars 18 and wheels 19 rotate relatively to the axle 2. Each collar 18 is provided with a toothed clutch member 21 which is secured to said collar by screws 22, and is provided at each side with discs 23. Rollers 24 are confined by these discs 23 and roll on the inclined surfaces of the teeth of the clutch member 21, so as to engage the inner cylindrical surface of a ring gear 25, the latter being also confined by discs 23. This gear 25, when the ground wheels 19 rotate in one direction, drives a small pinion 26 which is integral with a coaxial larger pinion 27. This combined pinion 26, 27 is arranged on a pair of ball bearings 28 which are mounted on a stationary stud shaft 29, the latter having a circular flange 30 which abuts against the plate 1 and prevents oil from passing through the hole 6, through which the shaft 29 extends. The pinion 27 drives a small pinion 31 which is keyed to the cutter shaft 32 having ordinary cutting blades 33. The pinion 31 abuts at one side against a shoulder 34 on the cutter shaft, and is provided at its other side with a hub extension 35, which abuts against the inner ring of a ball bearing 36. From this description, it may be seen that when the mower is moved forwardly, the ground wheels 19 will cause the cutter shaft 32 to rotate with a minimum of friction and noise, but when the ground wheels 19 are moved in the opposite direction, the clutch member 31 will rotate without moving the ring gear 25, and consequently, the cutter shaft 32 will not be turned in the reverse direction.

Each side plate 1 is provided with a housing plate 37, and each housing plate is identical with any other housing plate made in accordance with this invention, so that only a single die or mold is necessary to form the housing plates. The housing plate 37 is provided at its edge with an extending flange 38, having the same number of apertures as the apertures 4 of the side bar 1 to which it is connected, there being 14 apertures in the present instance. Screws 39 pass through the holes 4 and the holes in the flange 38, and they are provided with nuts 40 which secure the housing plate 37 to the side plate 1. Each housing plate 37 has an aperture to permit the sleeve 18 to extend therethrough, and adjacent this aperture, it has a circular channel 41 filled with packing to prevent oil from leaking out of the housing at this point. A screw 42 extends through the housing plate 37, into a threaded aperture of the stud shaft 29, for the purpose of locking the parts in position. At the point where the axle 2 is located, the housing plate has an aperture 2a, directly over the axle reduced portion 13 through which oil may be fed into the chamber formed by the housing plate 37 and side plate 1. At the point where the shaft 32 is located, the housing plate has an aperture closed by a screw plug 43. One end of the cutter shaft 37 may be provided with a threaded hole 45 to receive, when the plug 43 is removed, a threaded crank or the like, used for reversely turning the cutter shaft to cause the cutter blades 33 to sharpen themselves against the stationary cutter 53, hereinafter described. From this description, it will be seen that the gearing forming the transmission mechanism is housed in an oil-tight container which, when filled with oil, facilitates the easy running of the machine.

The ends of the axle 2 are provided with washers 46, which abut against the inner rings of the outer ball bearings 16 to hold the drive wheels 19 on said axle. The washers 46 are held in position by screws 47, and also function to maintain felt washers 46a in place, which latter keep the structure oil-tight at these points.

Near the rear end of each side bar 1, an inwardly extending lug 48 is secured to said bar by rivets or the like 49, which extend through the holes 8 of the plate, and each of these lugs 48 has a pair of threaded apertures to adjustably hold the screws 50. These screws are located at opposite sides of a cross-bar 51 which extends through the holes 9 of the side plates and supports rockers 52, the latter carrying the stationary cutter 53. The stationary cutter 53 may thus be swung about the shaft 51 by adjusing the screws 50 in the usual way.

The back roller shaft 3 has its ends fixed to vertical slotted members 54, and bolts 55 pass through these slots for adjustably securing said slotted members in position. Each bolt 55 passes through the aperture 10 of the side plate 1. A small guide bar 56 is secured to the side plate 1 by rivets 57 which extend through the apertures 11 of said side plate. The rear edges 58 of the slotted members 54 slide against the guides 56, so as to prevent the latter from vibrating during use.

The rear roller 59 is also of special construction, and it consists of a metal tube 60 provided at its ends with caps 61, which are recessed to receive ball bearings 62 and packings 63, the parts 62 and 63 surrounding the shaft 3 and the roller 59 being rotatably mounted on said shaft, and supported by the ball bearings 62.

The axles or bars 2 and 51 together with the two side plates 1, form a four-sided rigid frame.

From the foregoing, it will be seen that I have not departed from general principles employed in the standard type of lawn mower, but I have departed radically from the details of construction, and this with a view of producing high class lawn mowers by a minimum amount of manufacturing machinery. Furthermore, if a side bar 1 or housing 37 is damaged, and it is necessary to replace the same, either of these may be ordered from the factory without liability of confusing right and left hand parts.

It is believed that the construction, operation and advantages of the invention will be readily understood from the above description, and I am aware that changes may be made in the details disclosed without departing from the spirit of the invention, as expressed in the claims.

What I claim and desire to secure by Letters Patent is:—

1. In a lawn mower, a pair of gearing housings, each housing having an endless marginal flange and constructed identically the same as the other so that it is adapted for use at either side of the machine.

2. In a lawn mower, a pair of identical flat side frames, and a pair of identical gearing housings with endless marginal flanges whereby they are secured to the side frames, said frames and housings being designed for either right or left hand use.

3. A lawn mower comprising two stationary axles, side frames fixed to said axles, gearing housings fixed to the side frames, each frame and its associated housing forming an oil chamber, ground wheels rotatably mounted on one of said axles, a cutter-shaft extending into said chambers, and gearing in the chambers for driving the cutter shaft from the ground wheels.

4. In a lawn mower, identical side frames, stationary axles rigidly connecting said frames, identical housings secured to the frames, each frame and its housing forming an oil chamber, anti-friction bearings arranged in the chambers on one of said axles, sleeves on said bearings, ground wheels secured to said sleeves, a cutter shaft having its ends extending into said chambers, and gearing in the chambers for driving the cutter shaft from said sleeves in a single direction only.

5. In a lawn mower, a stationary axle, a plurality of spaced anti-friction bearings arranged on one end of said axle, a sleeve mounted on said bearings, a ground wheel fixed to said sleeve, a toothed clutch member with a confining disk at each side thereof mounted on and secured to said sleeve, a ring gear surrounding said clutch member intermediate the aforesaid disks, and rollers confined between the clutch member side disks and ring gear for driving the latter in a single direction only.

6. In a lawn mower, a gearing housing, a stationary axle having a part projecting through said housing, a sleeve mounted on the portion of the axle which extends through the housing, said sleeve extending through one wall of the housing, a ground wheel fixed to the sleeve for driving the latter, a circular channel in the last mentioned wall surrounding the sleeve, and a packing ring in the channel engaging said sleeve for preventing oil in the housing from escaping along said sleeve.

7. In a lawn mower, a pair of identical side frames, a stationary axle having its ends fixed to said frames, a pair of identical gear housings secured to said frames and cooperating therewith to form oil chambers, supporting wheels rotatably mounted on the axle, a rotary cutter, a shaft for the cutter mounted on said side frames, means in the oil chambers for driving the cutter shaft from the supporting wheels, a stationary knife supported by the side frames and cooperating with the rotary cutter, a roller shaft arranged between and connecting the rear ends of said side frames, and a roller mounted on said shaft.

8. In a lawn mower, a pair of identical side frames, each frame formed of a plain piece of sheet metal apertured at various points, and a pair of identical gear housings cooperating with the side frames to form oil chambers, each of said housings being of dished formation and provided with an endless marginal flange arranged parallel to the sides of the side frame with which it is associated, and means passing through certain of the apertures of the side frames for securing the gearing housings to the side frames.

9. A lawn mower including side frames and gear casings attached to the side frames, each frame and its associated casing forming an oil chamber, ground wheels, a cutter shaft extending into said chambers, a rotary cutter mounted on said shaft, a stationary knife connected to the side frames and cooperating with the rotary cutter, power transmitting means in the chambers connecting the ground wheels to the cutter shaft, one of said casings having an aperture closed by a removable plug, and arranged adjacent to one end of the cutter shaft, the last mentioned end of the cutter shaft being provided with means to permit the attachment to a crank to allow the rotary cutter to be reversely rotated independently of the ground wheels for sharpening the rotary cutter on the stationary knife.

10. In a lawn mower, a pair of side frames, a pair of stationary shafts connecting the front and rear ends of the frames together and rigidly secured to said frames, a housing detachably connected to the outer side of each side frame and forming with the latter an oil-tight chamber, ground wheels rotatably mounted on one of said shafts, a cutter shaft having its ends extending into said chambers and power transmitting means in the respective chambers operatively connecting the ground wheels to the cutter shaft each said means including a clutch with a co-operative ring gear adapted to drive the latter in one direction only.

11. In a lawn mower, a gear housing comprising a flat plate and a housing member with an endless surrounding flange both of which are configured and adapted for right or left hand connectable application.

12. In a lawn mower, a pair of identical side frames, a stationary axle having its rear ends fixed to said side frames, a pair of identical gear housings secured to the side frames and co-operating therewith to form oil chambers, supporting wheels rotatably mounted on the axle, a rotary cutter, a shaft for the cutter mounted on the side frames; means in the oil chambers for driving the cutter shaft from the supporting wheels, a stationary knife supported by the side frames and co-operating with the rotary cutter, a ground roller between the rear ends of the side frames, and means whereby said ground roller may be vertically adjusted while restrained against lateral displacement.

13. In a lawn mower, a pair of identical side frames, a stationary axle having its rear end fixed to said side frames, a pair of identical gear housings secured to the side frames and co-operating therewith to form oil chambers, supporting wheels rotatably mounted on the axle, a rotary cutter, a shaft for the cutter mounted on the side frames, means in oil chambers for driving the cutter shaft from the supporting wheels, a stationary knife supported by the side frames and co-operating with the rotary cutter, a ground roller with attached slotted members for interposition between the rear ends of the side frames, guide bars secured to the side frames co-operative with the slotted members and bolts passing through the slotted members for adjustably securing the same to the side frames aforesaid.

In testimony whereof I affix my signature.

HARRY T. COLDWELL.